United States Patent
Kim

(10) Patent No.: US 8,203,406 B2
(45) Date of Patent: *Jun. 19, 2012

(54) MAGNETIC HAVING LINEAR MAGNETIC FLUX DENSITY

(75) Inventor: Si-Hwan Kim, Incheon (KR)

(73) Assignee: Kyungdong Network Co., Ltd., Seoul (KR)

( * ) Notice: Subject to any disclaimer, the term of this patent is extended or adjusted under 35 U.S.C. 154(b) by 527 days.

This patent is subject to a terminal disclaimer.

(21) Appl. No.: 12/278,890

(22) PCT Filed: Jan. 3, 2007

(86) PCT No.: PCT/KR2007/000021
§ 371 (c)(1),
(2), (4) Date: Aug. 8, 2008

(87) PCT Pub. No.: WO2007/081110
PCT Pub. Date: Jul. 19, 2007

(65) Prior Publication Data
US 2009/0243775 A1    Oct. 1, 2009

(30) Foreign Application Priority Data
Jan. 10, 2006    (KR) .................. 10-2006-0002767

(51) Int. Cl.
H01F 7/02      (2006.01)
G01L 9/10      (2006.01)
(52) U.S. Cl. ......................................... 335/302; 73/722
(58) Field of Classification Search .......... 335/302–306; 73/722, 735, 728
See application file for complete search history.

(56) References Cited

U.S. PATENT DOCUMENTS 4,627,292 A * 12/1986 Dekrone ........................ 73/728
4,638,250 A    1/1987 Shen-Orr et al.
4,717,873 A * 1/1988 Carr et al. ................. 324/207.16
(Continued)

FOREIGN PATENT DOCUMENTS
EP        0523002 A1    1/1993
(Continued)

OTHER PUBLICATIONS
International Search Report for Application No. PCT/KR2007/000021, dated Apr. 12, 2007.

*Primary Examiner* — Anh Mai
*Assistant Examiner* — Bernard Rojas
(74) *Attorney, Agent, or Firm* — Nelson Mullins Riley & Scarborough LLP; Anthony A. Laurentano

(57) ABSTRACT

The present invention relates to a magnet having a linear magnetic flux density, which causes the magnetic flux density thereof to vary linearly and, more particularly, to a magnet having a linear magnetic flux density, in which the shape and magnetization pattern of the magnet are changed so that displacement in proportion to linearly varying displacement from the magnet is more accurately measured using a magnetic flux sensor, thus causing the magnetic flux density to vary linearly (or rectilinearly) according to the displacement. The present invention is configured to have a rectangular shape or a trapezoid shape so that displacement in proportion to linearly varying displacement from the magnet is more accurately measured using a magnetic flux sensor, and is configured such that the value of magnetic flux density varies linearly (rectilinearly) according to the magnetization pattern of the rectangular shape or a trapezoid shape.

10 Claims, 8 Drawing Sheets

U.S. PATENT DOCUMENTS

| | | | |
|---|---|---|---|
| 5,174,832 A | 12/1992 | Schmid et al. | |
| 6,018,241 A * | 1/2000 | White et al. | 324/207.2 |
| 6,522,130 B1 * | 2/2003 | Lutz | 324/207.2 |
| 7,034,523 B2 * | 4/2006 | Fahrlander et al. | 324/207.2 |
| 7,677,108 B2 * | 3/2010 | Kim | 73/722 |

FOREIGN PATENT DOCUMENTS

| | | |
|---|---|---|
| JP | 04-271425 | 9/1992 |

* cited by examiner

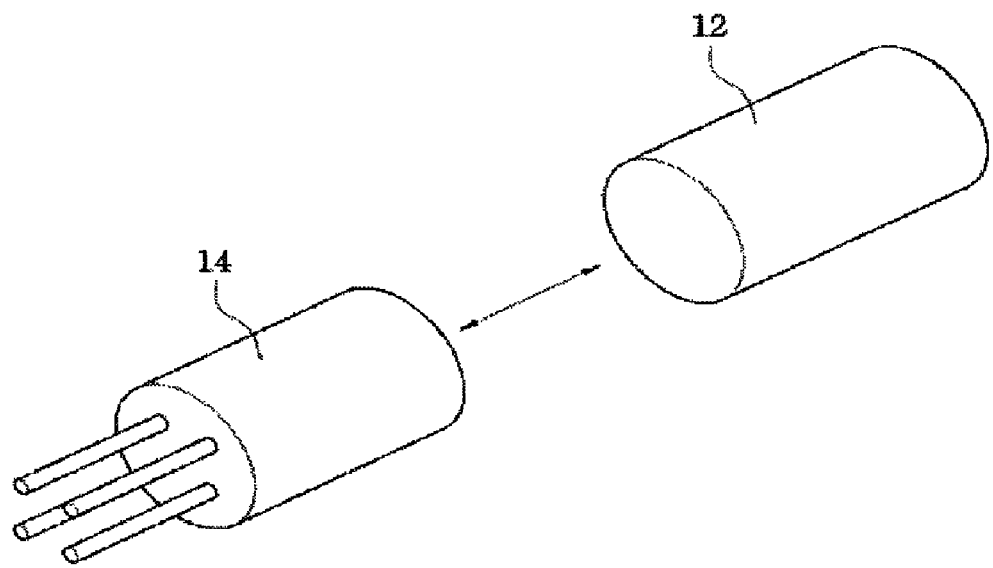
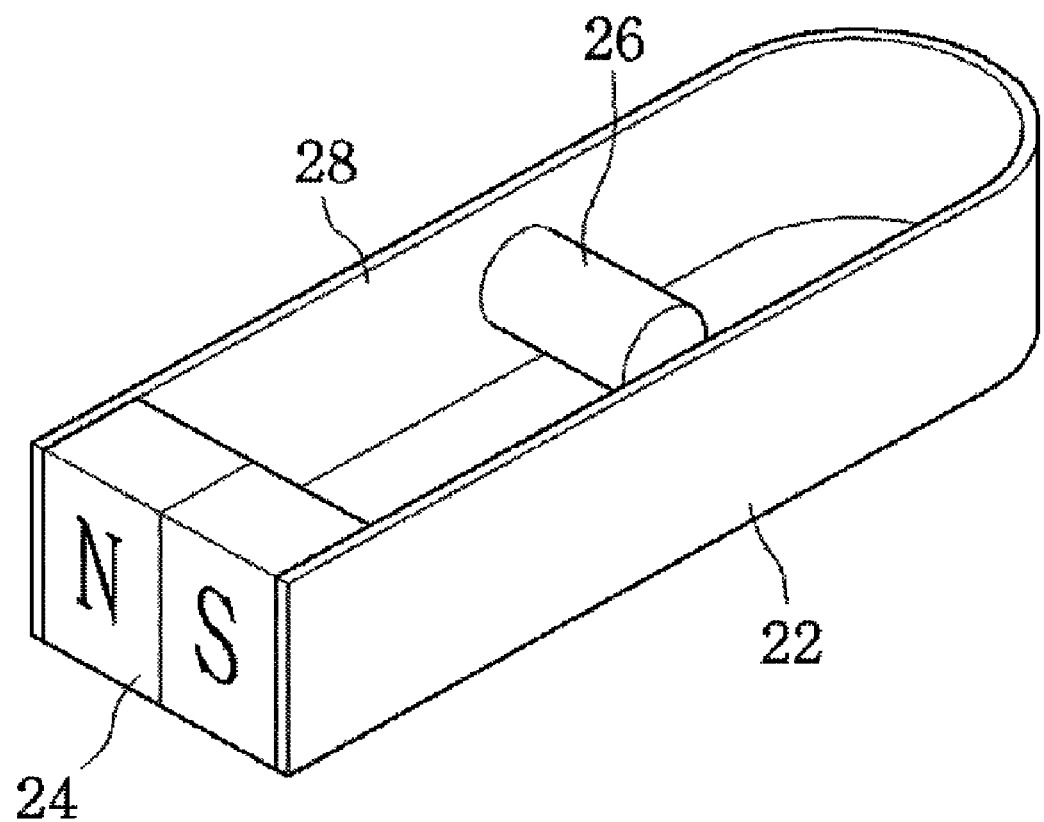

[Fig. 3]
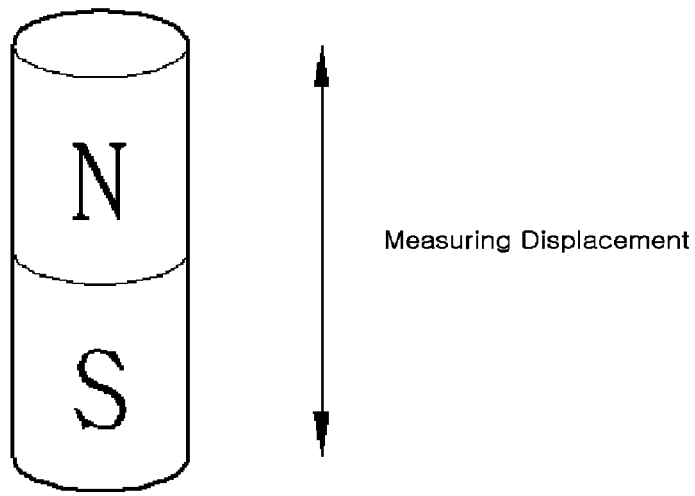
Measuring Displacement
[Fig. 4]
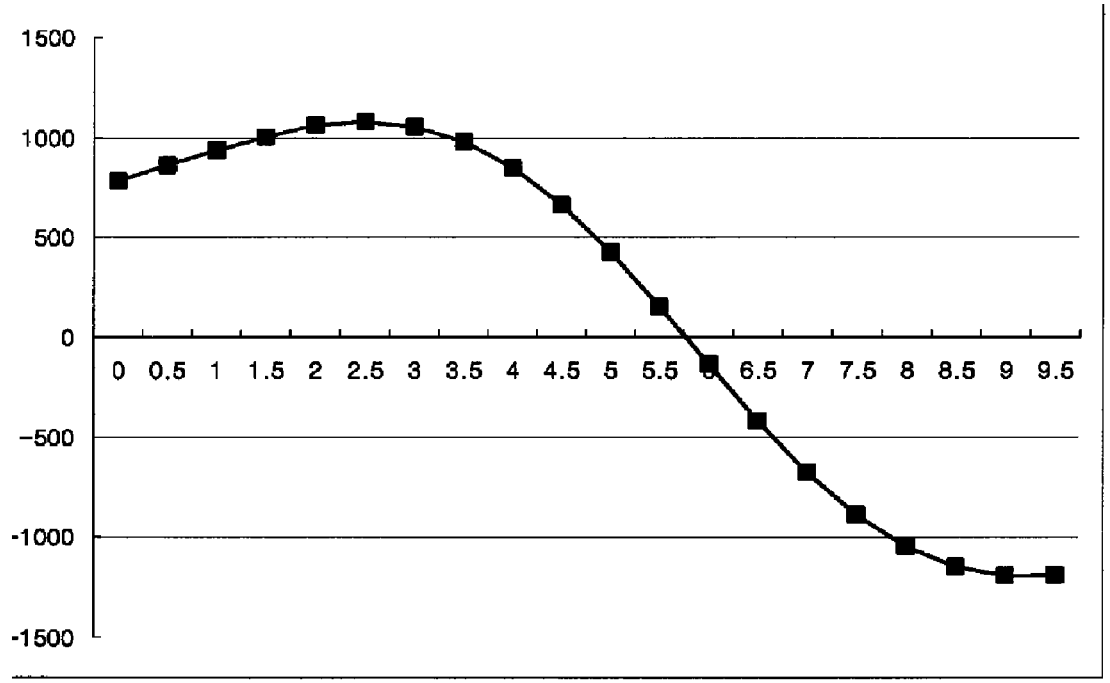

[Fig. 5]
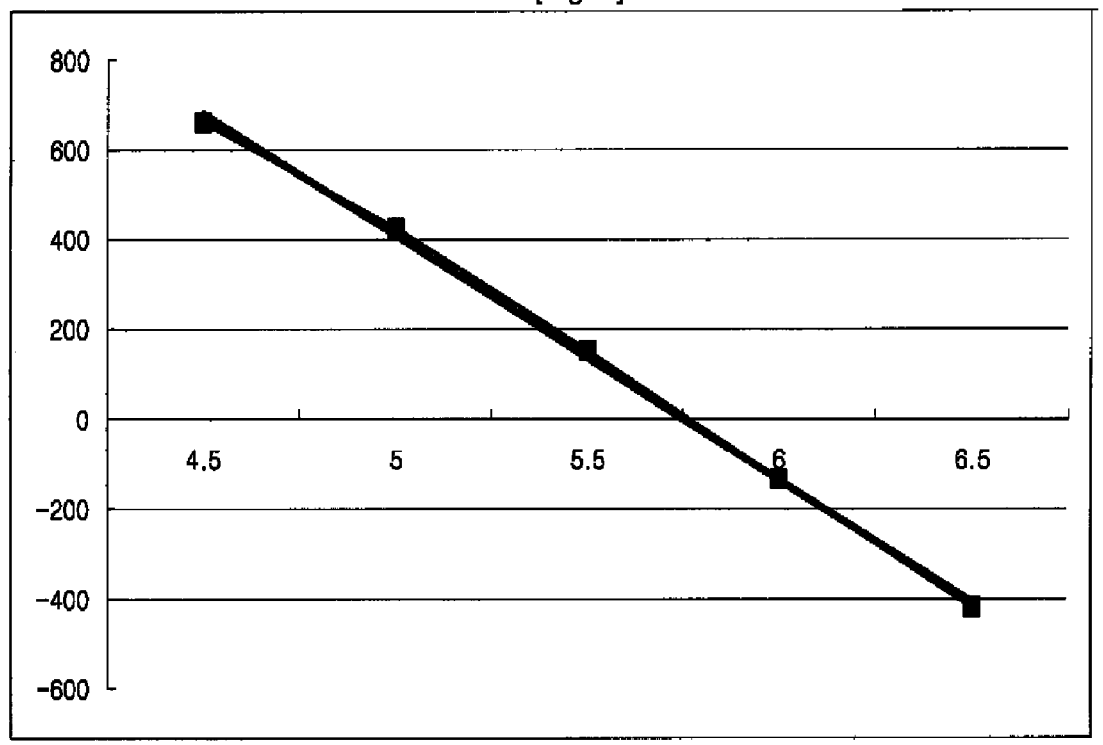
[Fig. 6]
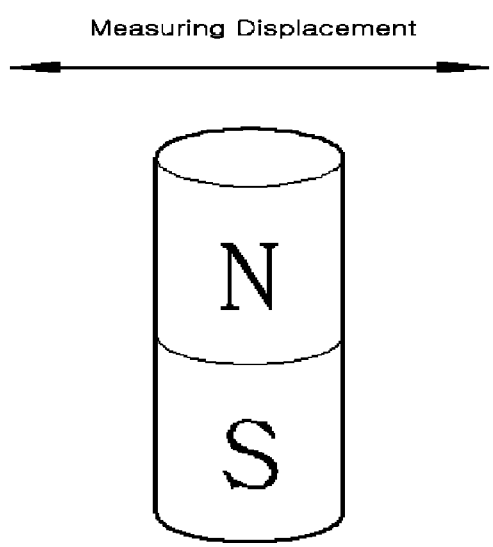
Measuring Displacement

[Fig. 7]
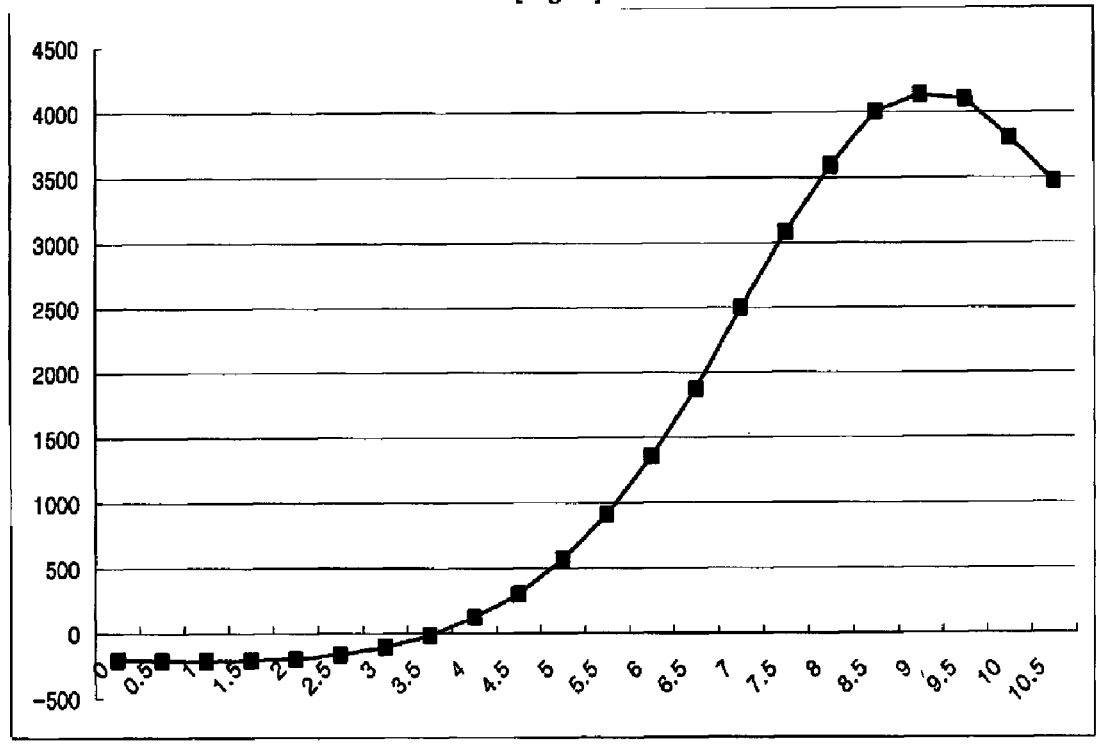
[Fig. 8]
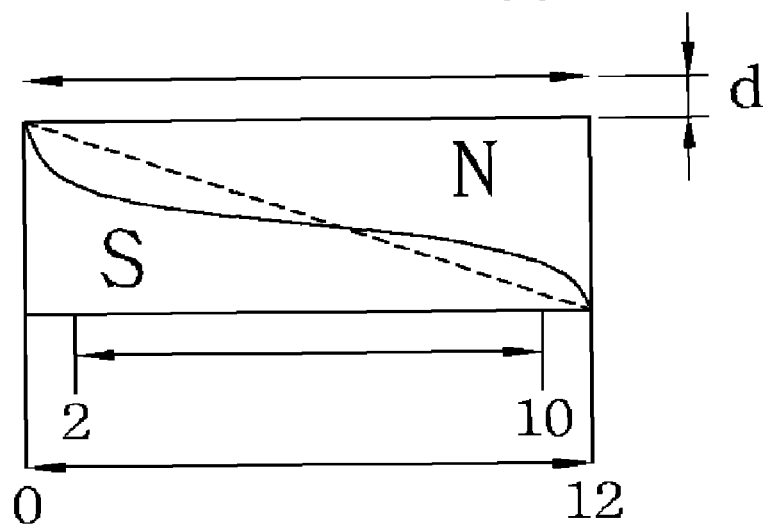

[Fig. 9]
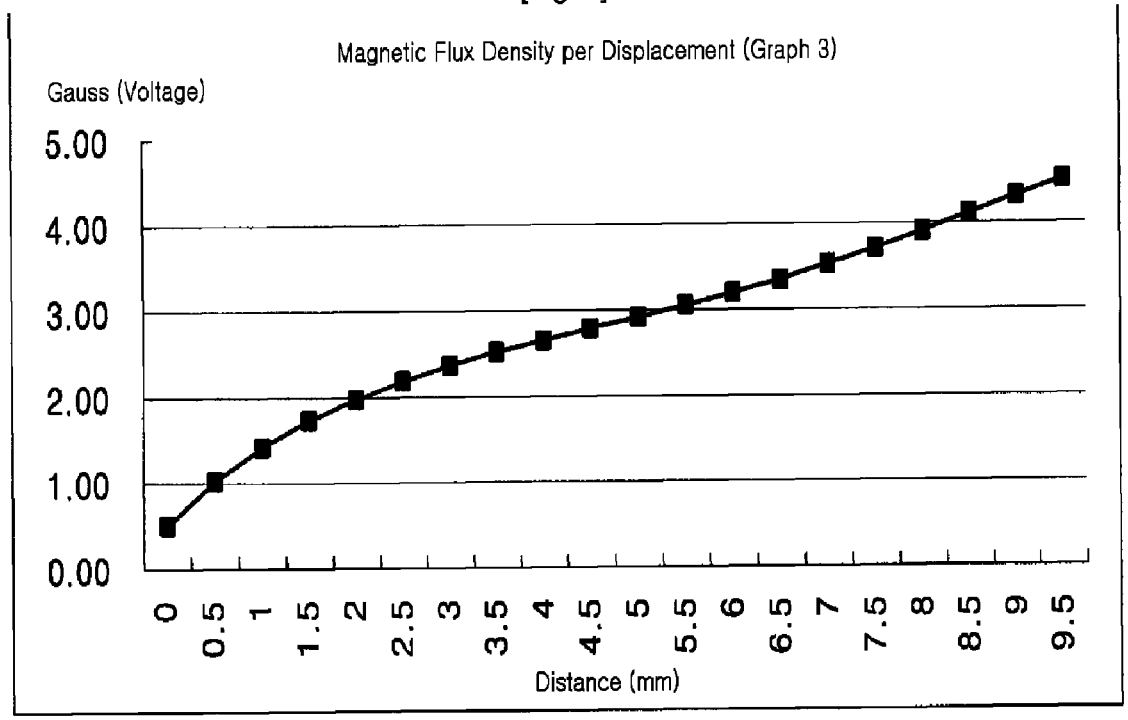
[Fig. 10]
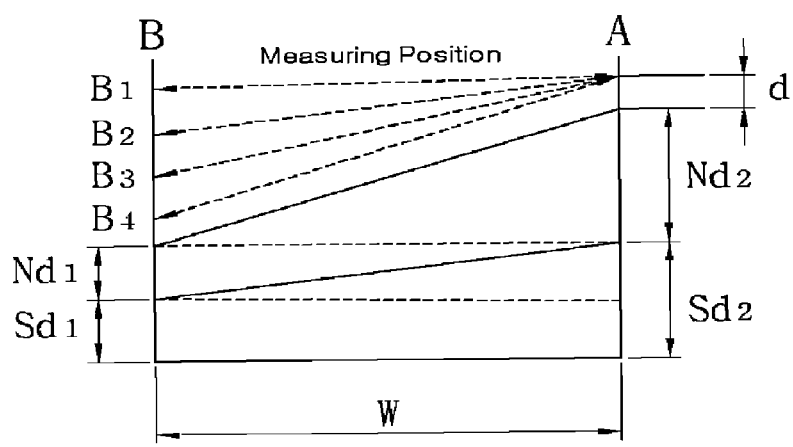

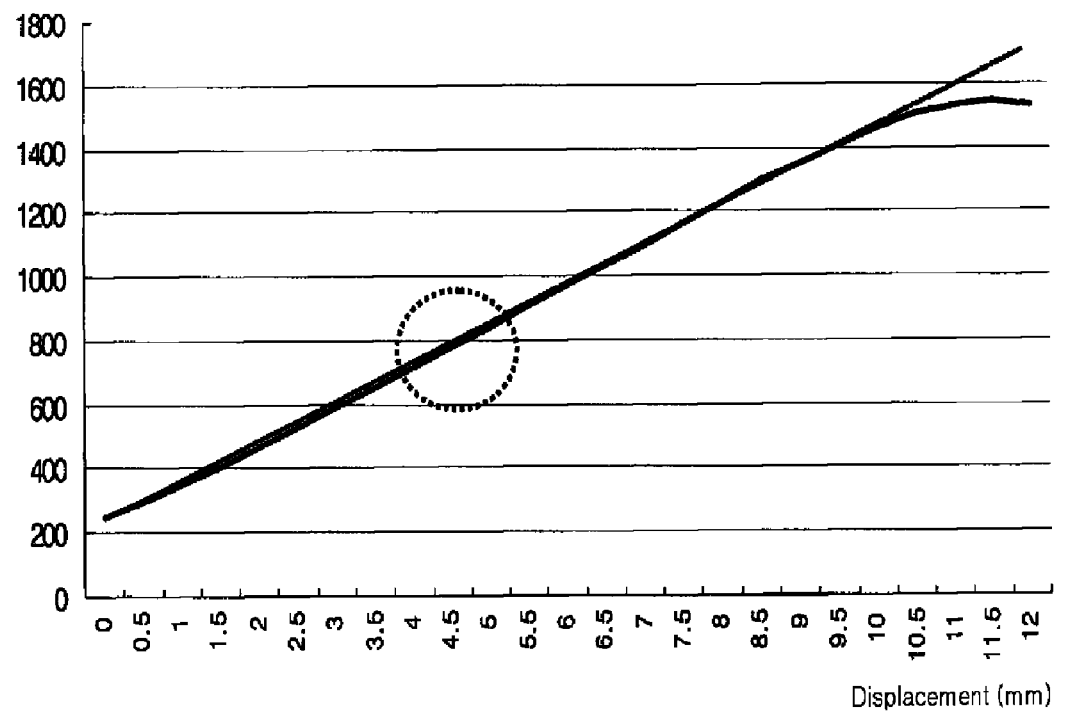
[Fig. 11]
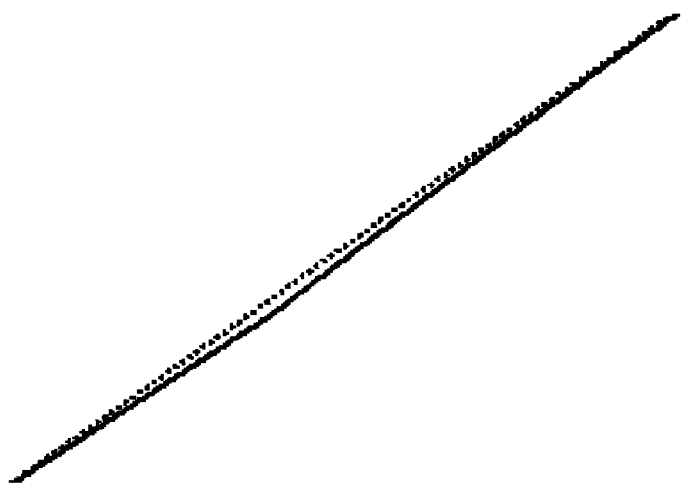
[Fig. 12]

[Fig. 13]
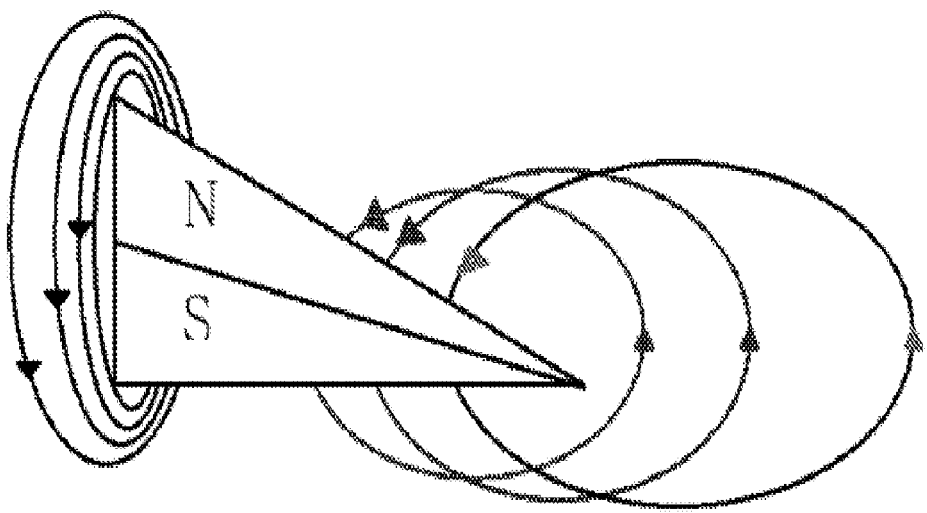
[Fig. 14]
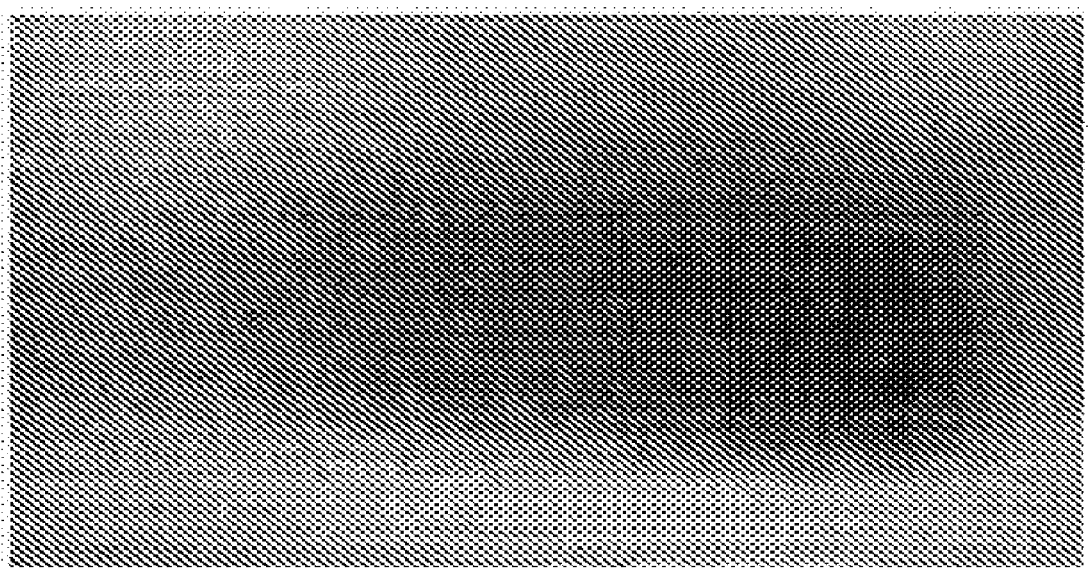

[Fig. 15]
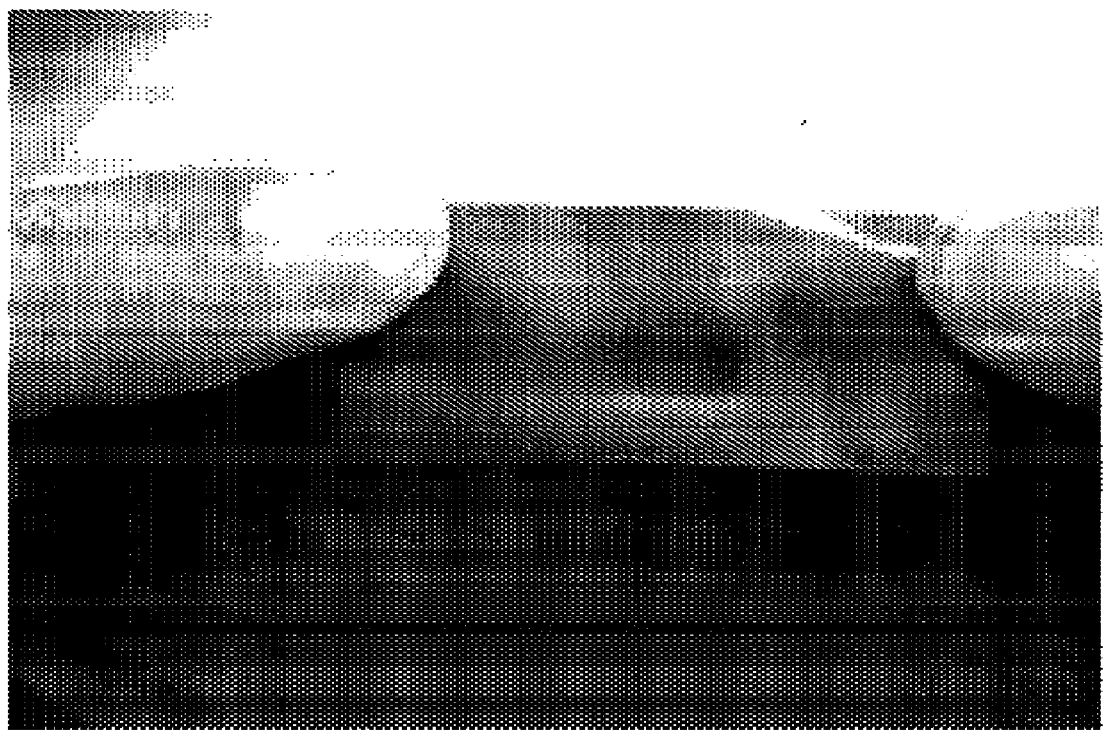
[Fig. 16]
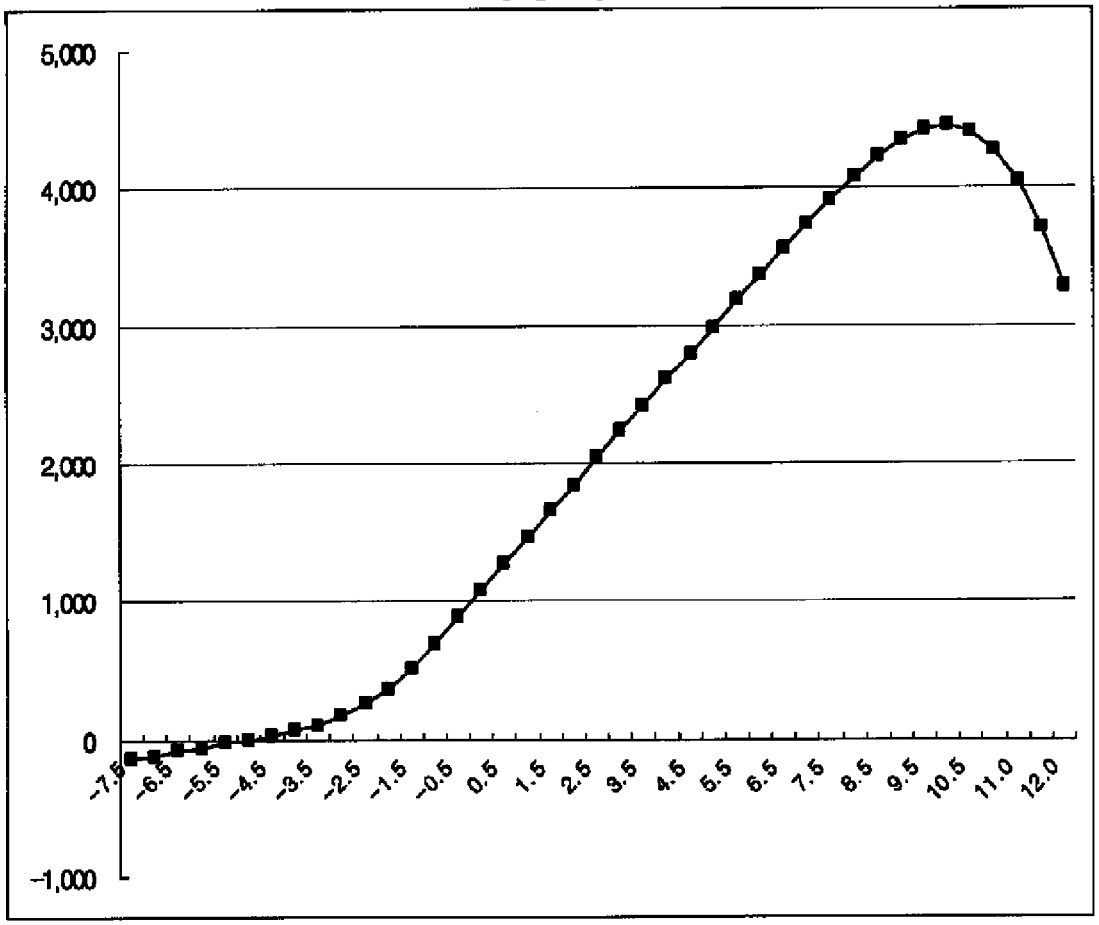

MAGNETIC HAVING LINEAR MAGNETIC FLUX DENSITY

TECHNICAL FIELD

The present invention relates to a magnet having a linear magnetic flux density, which causes the magnetic flux density thereof to vary linearly and, more particularly, to a magnet having a linear magnetic flux density, in which the shape and magnetization pattern of the magnet are changed so that displacement in proportion to linearly varying displacement from the magnet is more accurately measured using a magnetic flux sensor, thus causing the magnetic flux density to vary linearly (or rectilinearly) according to the displacement.

BACKGROUND ART

A magnet is an object that has a magnetic force and attracts iron powder. The term 'permanent magnet' refers to a magnet having a strong magnetic force, which is manufactured for industrial use. Generally, the permanent magnet is commonly called a magnet.

Iron pieces disposed around a magnet are attracted by the magnet. The space affected by the magnetic force is called a magnetic field. In other words, it can be said that the magnet generates the magnetic field. The shape of the magnetic field may be ascertained using a magnetic field pattern obtained with iron powder. When a thick piece of white paper is placed on the magnet and then the iron powder is uniformly scattered on the paper, the magnetic field pattern becomes visible. When a small magnetic needle is placed on the pattern, it orients itself in a direction depending on lines of magnetic force. The lines of magnetic force from the N-pole of the magnet run to the S-pole of the magnet.

The force between the two poles follows Coulomb's law, in which the force is inversely proportional to the square of the distance between the two poles, and is proportional to the intensity of the magnetic poles. The product of the intensity of the magnetic poles and the distance between the two poles is defined as a "magnetic moment." The magnetic poles are essentially formed of a pair of N and S-poles having the same intensity, and thus the magnetic moment is considered as a substantial physical quantity rather than as the intensity of the magnetic poles. The magnetic moment is represented as a vector directed from the S-pole to the N-pole. When the force between two magnetic moments is calculated, it is inversely proportional to the fourth power of distance. For this reason, the attractive force between two magnets increases as the magnets become closer to each other and rapidly decreases as the magnets become more distant from each other.

Magnetization is performed through a change in the shapes, arrangement and orientation of magnetic domains. Once an object, having a structure in which such characteristics are almost unchanged, is magnetized, it is not restored to its original state even after a magnetic field is reduced to 0, and thus a magnetic moment remains. Such an object having a large residual magnetization is a permanent magnet.

The term 'magnetic flux' refers to an amount obtained by performing integration on a sectional area perpendicular to the direction of magnetic flux density or magnetic induction. The unit of magnetic flux is Maxwells, Mx, in the CGS unit system and is Webers, Wb, in the MKS unit system or the SI unit system. When a magnetic flux passing though coil varies with time, a voltage that is proportional to the variation rate thereof is induced between both ends of the coil (Faraday' electromagnetic induction law). The direction of the voltage is the same as the direction of the disturbance of the variation in the magnetic field induced by the current. This is called 'Lenz's law.' The magnetic flux is generated by current passing through a permanent magnet or coil.

There are various types of sensors corresponding to methods of detecting a magnetic field, and the most widely known sensor is a hall sensor. The hall sensor operates in such a way that, when a magnetic field is applied in a direction perpendicular to a semiconductor device (hall device) while current flows through the electrodes of the semiconductor device (hall device), an electric potential is generated to be perpendicular to the directions of the current and the magnetic field.

As the simplest device for measuring distance, there is a device using a permanent magnet and a sensor for detecting magnetic flux. The device measures magnetic flux density varying according to variation in the distance from the permanent magnet and measures the distance based on the voltage potential generated from the sensor.

However, the magnetic flux density generated by the permanent magnet is not linearly formed according to the distance, so that a program or electronic circuitry for compensating for nonlinearity is provided in the device in order to use the device as a sensor for effectively measuring distance. Accordingly, the device can function as a device for accurately measuring distance only when this condition is satisfied. Furthermore, in order to compensate for the distribution of nonlinear magnetic flux density depending on distance, which is generated by a single magnet, extensive research into a structure in which a linear magnetic flux density can be achieved by combining various types of magnets with a plurality of magnets has been conducted.

Recently, various types of non-contact distance measurement devices, each of which, in a linear range or in an angular range, detects the absolute location of a body and measures displacement that is linear and forms an angle, have been developed.

There are various schemes for detecting measurement location in a non-contact manner. Although a device using a sliding resistor or a potentiometer is the most representative, the reliability thereof is not satisfactory. Although an optical positioner has an optical sensor for reading an optical range, such as a slit range, the structure thereof is more complicated. In addition, although there is a magnetic range in which a range recorded on a magnetic medium is read by a magnetic sensor, the structure is also complicated, and thus the absolute location cannot be detected.

That is, only the distance between two arbitrary points can be measured. The present invention provides a magnet having a linear magnetic flux density, which can detect the absolute location of a body to be detected, and has a very simple structure, a long measurement range and high reliability.

A conventional device is configured such that a magnetic sensor 14 measures distance while moving relative to a permanent magnet 12 in the direction of the polar axis of the magnet 12. The schematic perspective view of the conventional device for detecting a location (hereinafter refers to as a 'location detector') is shown in FIG. 1. In the drawing, the permanent magnet 12 is arranged opposite the magnetic sensor 14. In this case, the distance L between the permanent magnet 12 and the magnetic sensor 14 may vary. That is, relative movement between the two members is permitted. The magnetic sensor 14 moves relative to the permanent magnet 12 in the direction of the polar axis of the magnet 12. A magnetic field emitted from the permanent magnet 12 is sensed by a sensitive magnetic sensing device that is included in the magnetic sensor 14. The distance L is indicated and detected by an indication signal output from the magnetic sensor 14. However, in the above-described construction, the effective distance, which is a highly linear characteristic curve, is very short.

Furthermore, as shown in FIG. 2, a closed magnetic circuit 28 includes a U-shaped yoke 22, a permanent magnet 24, and a magnetic sensor 26 having a magnetic resistance sensing element, such as a Baber pole-type element. The magnetic sensor 26 moves relative to the permanent magnet 24 in a direction perpendicular to the polar axis of the magnet 24. However, in the above-described construction, it is also difficult to obtain an accurate linear characteristic curve.

DISCLOSURE OF INVENTION

Technical Problem

Accordingly, required is a magnet having a linear magnetic flux density, in which the shape and magnetization pattern of the magnet are changed so that the shape and magnetization pattern of the magnet are changed so that displacement in proportion to linearly varying displacement from the magnet is more accurately measured using a magnetic flux sensor, thus causing the magnetic flux density to vary linearly (or rectilinearly) according to the displacement.

Technical Solution

In order to solve the above problems, an object of the present invention is to provide a magnet having a linear magnetic flux density, in which the shape and magnetization pattern of the magnet are changed so that displacement in proportion to linearly varying displacement from the magnet is more accurately measured using a magnetic flux sensor, thus causing the magnetic flux density to vary linearly (or rectilinearly) according to the displacement.

Advantageous Effects

According to the present invention, a typical error correction process, which is a complicated process of converting variation in curve-shaped magnetic flux density to a rectilinear line, and location-related errors, which be generated during the error correction process, are eliminated using a construction that allows the intensity of magnetic flux, which is emitted from the surfaces of poles, to vary linearly by changing the shape of a magnet and adjusting the intensity and range of magnetization, and measures the density of linear magnetic flux that is emitted from the surfaces of the poles using a sensor that is spaced apart from the surfaces of the poles by a predetermined distance, is parallel to the surfaces of the poles, and moves parallel to the surfaces of the poles, thus accurately measuring the absolute distance based on voltage generated by the sensor. Accordingly, a more accurate location sensor using a magnet can be implemented.

BRIEF DESCRIPTION OF THE DRAWINGS

FIG. 1 is a schematic perspective view of a conventional location detector;

FIG. 2 is a perspective view of a conventional location detector using a U-shaped yoke;

FIG. 3 is a view showing the shape and magnetization pattern of a typical magnet;

FIG. 4 is a graph showing variation in magnetic flux density in a direction parallel to the polar axis of the typical magnet;

FIG. 5 is a graph showing an effective use interval in which linearity is exhibited;

FIG. 6 is a view showing the shape and magnetization pattern of the typical magnet;

FIG. 7 is a graph showing variation in magnetic flux density in a direction perpendicular to the polar axis of the typical magnet;

FIG. 8 is a view showing the shape and magnetization pattern of a magnet according to the present invention;

FIG. 9 is a graph showing variation in magnetic flux density according to the present invention;

FIG. 10 is a view showing the shape and magnetization pattern of a magnet according to another embodiment of the present invention;

FIG. 11 is a graph showing variation in magnetic flux density according to another embodiment of the present invention;

FIG. 12 is an enlarged view of circled portion A of FIG. 11 according to the present invention;

FIG. 13 is a view showing variation in boundary depending on the intensity of magnetic flux according to the present invention;

FIGS. 14 and 15 are pictures showing magnetic flux distributions of the magnet at measurement locations, obtained using a magnetic viewer; and FIG. 16 is a graph showing variations in magnetic flux densities of triangular and rectangular magnets according to the present invention.

BEST MODE FOR CARRYING OUT THE INVENTION

The present invention provides a magnet having a linear magnetic flux density, the magnet being used for a sensor for measuring distance, wherein the magnet is configured to have a rectangular shape, and the N and S-poles of the magnet are magnetized in the form of a sinusoidal wave in a diagonal direction from an edge of the rectangular-shaped magnet.

Mode for the Invention

Preferred embodiments according to the present invention are described in detail with reference the accompanying drawings below.

FIG. 1 is a schematic perspective view of a conventional location detector, FIG. 2 is a perspective view of a conventional location detector using a U-shaped yoke, FIG. 3 is a view showing the shape and magnetization pattern of a typical magnet, FIG. 4 is a graph showing variation in magnetic flux density in a direction parallel to the polar axis of the typical magnet, FIG. 5 is a graph showing an effective use interval in which linearity is exhibited, FIG. 6 is a view showing the shape and magnetization pattern of the typical magnet, FIG. 7 is a graph showing variation in magnetic flux density in a direction perpendicular to the polar axis of the typical magnet, FIG. 8 is a view showing the shape and magnetization pattern of a magnet according to the present invention, FIG. 9 is a graph showing variation in magnetic flux density according to the present invention, FIG. 10 is a view showing the shape and magnetization pattern of a magnet according to another embodiment of the present invention, FIG. 11 is a graph showing variation in magnetic flux density according to another embodiment of the present invention, FIG. 12 is an enlarged view of circled portion A of FIG. 11 according to the present invention, FIG. 13 is a view showing variation in boundary depending on the intensity of magnetic flux according to the present invention, FIGS. 14 and 15 are pictures showing magnetic flux distributions of the magnet at measurement locations, which are obtained using a magnetic viewer, and FIG. 16 is a graph showing variations in magnetic flux densities of triangular and rectangular magnets according to the present invention.

FIG. 1 is a schematic perspective view of a conventional location detector, and FIG. 2 is a perspective view of a conventional location detector using a U-shaped yoke. As described above, the conventional location detectors are problematic in that linear magnetic flux density is not accurately implemented, and in that there is a relatively small range in which the linear magnetic flux density is exhibited.

FIG. 3 is a view showing the shape and magnetization pattern of a typical magnet. The magnet has a structure in which it is divided into an N-pole and an S-pole, having the same area, and is magnetized. Although a sensor using the typical magnet adopts a scheme for measuring the distance varying from the polar axis of the magnet using a sensor, the present invention adopts a scheme for measuring the distance varying along a rectilinear line, which is spaced apart from the surface of the N or S-pole in a direction perpendicular to the polar axis by a predetermined distance and is parallel to the surface of the pole. The conventional scheme is disadvantageous in that it is difficult to realize linearity because the magnetic flux density does not vary linearly according to the distance from the magnet, and is inversely proportional to the square of the distance.

The important point of the present invention is that the intensity of magnetic flux, which is emitted from the surface of the pole, is varied linearly by changing the shape of the magnet and adjusting the intensity and range of magnetization, that the linear magnetic flux density generated from the surface of the pole is measured by a sensor moving parallel to the surface of the pole, and that an accurate absolute distance is measured based on a voltage generated from the sensor.

FIG. 4 is a graph showing variation in magnetic flux density in a direction parallel to the polar axis of the typical magnet. From the graph, it can be seen that the polarity of the magnetic flux density is changed and that the interval in which linearity is exhibited is very small because the variation in magnetic flux density is measured in a direction that moves parallel to a side surface of the N and S-poles, which are opposite each other.

FIG. 5 is a graph showing an effective use interval in which linearity is exhibited, and indicates that the interval, in which linearity is exhibited and which can be used for a sensor, is only about 20% of the total interval.

FIG. 6 is a view showing the shape and magnetization pattern of the typical magnet, and indicates that the measurement of the density of magnetic flux, which is emitted from the same magnet as that shown in FIG. 3, is performed in a direction perpendicular to the polar axis, and is parallel to the surfaces of the poles.

FIG. 7 is a graph showing variation in magnetic flux density in a direction perpendicular to the polar axis of the typical magnet, and is a graph showing measured values obtained using the shape shown in FIG. 6. Although this graph indicates that the interval in which linearity is exhibited is slightly wider than the interval shown in FIG. 5, it can be seen that the interval does not exceed 20 to 30% of the total interval.

FIG. 8 is a view showing the shape and magnetization pattern of a magnet according to the present invention, and indicates that the N and S-poles of the magnet are magnetized in the form of a sinusoidal wave in a diagonal direction from the upper left edge of a rectangular-shaped magnet.

Generally, the strength of magnetic force is defined as being inversely proportional to the square of a measured distance. Accordingly, in the shape of a typical magnet (for example, a ring or a bar) and in a structure in which the magnet is magnetized to a predetermined intensity, variation in the strength of magnetic force depending on displacement is represented by the graph of a quadratic function, and is not linear.

Accordingly, the magnet according to the present is manufactured to have a structure such that variation in the strength of magnetic force is linear by changing the shape and magnetization pattern of the typical magnet.

When the magnet is magnetized in a diagonal direction, indicated by the dotted line shown in FIG. 8, the magnetic flux density of the N-pole depending on displacement is inversely proportional to the square of distance, and magnetic flux is distributed in the diagonal direction. Accordingly, when magnetic flux density is measured at a location that is spaced apart from the N-pole by 1-, the magnetic flux density depending on displacement does not vary linearly in the graph of the magnetic flux density, so that the magnetization pattern of the magnet is changed such that linearity is exhibited in a specific interval, as indicated by the solid line of FIG. 8.

In order to enable the magnetic flux density to vary linearly according to distance in the specific interval, the magnet is manufactured such that the magnetization pattern thereof is slightly distorted and changed in a diagonal direction, as shown in FIG. 8.

In FIG. 8, the displacement of a sensor is measured over the intervals 0 through 12 of the magnet. The sensor is spaced apart from the surface of the pole by a predetermined distance d, is disposed perpendicular to the polar axis of the magnet, and moves parallel to the surface of the pole. The intervals 2 through 10, other than end portions of the intervals 0 through 12 of the magnet, in which nonlinearity is slightly exhibited, may be used as a more accurate location sensor use interval.

In order to measure variation in magnetic flux density depending on actual distance, the variation in magnetic flux density for each distance was measured using a programmable hall Integrated Circuit (IC). The programmable hall IC that was used is a Micronas' component, and has an error rate of ±0.1%. The results of the experiment are shown in the graph of FIG. 9.

FIG. 9 is a graph showing variation in magnetic flux density according to the present invention, and indicates that the value of magnetic flux density for each distance is linear in a specific interval (2 through 8). Accordingly, it can be seen that the magnetization pattern of the magnet is changed and, thus, the value of magnetic flux density for each distance can be made linear in a specific interval. However, the strength of magnetic force is inversely proportional to the square of distance as the distance from which the magnetic flux density is measured increased, so that the magnetization pattern of the magnet must be designed according to measurement distance.

FIG. 10 is a view showing the shape and magnetization pattern of a magnet according to another embodiment of the present invention. The width of the bottom of the magnet is W, and may be adjusted as needed, the height of the left side of the S-pole of the magnet is Sd1, and the height of the right side of the S-pole of the magnet is Sd2. Furthermore, the height of the left side of the N-pole of the magnet is Nd1, and the height of the right side of the N-pole of the magnet is Nd2. The N-pole is disposed on the S-pole. Accordingly, in the construction in which the S and N-poles are arranged, the total height of the left side of the magnet is Sd1+Nd1, and the total height of the right side of the magnet is Sd2+Nd2, therefore the magnet has a rectangular shape, and the height of the right side of the magnet is greater than the height of the left side thereof.

When the shape of the magnet is represented by numerical values, the height of the left side of the S-pole of the magnet is 1, and the height of the right side of the S-pole of the magnet is 2, the height of the left side of the N-pole of the magnet is 1, and the height of the right side of the N-pole of the magnet is 2. Accordingly, in the construction in which the S and N-poles are arranged, the total height of the left side of the magnet is 2 and the total height of the right side of the magnet is 4, therefore the magnet has a rectangular shape, and the height of the right side of the magnet is twice the height of the left side thereof.

It is preferred that the N and S-poles be magnetized such that the respective widths of left and right surfaces of the magnet have a ratio of 1~2:2~4.

A magnet is magnetized to have the structure of FIG. 10, and variation in magnetic flux density for each distance is measured. Measurement locations are changed according to angles of rectilinear lines between point A, which is spaced apart from the upper end of the right surface of the magnet by an arbitrary distance d, and points B1 to B4, which form different angles with point B on the left surface of the magnet. The location in which linearity is best exhibited among measured values is represented in the graph of FIG. 11, which will be described later.

To change the measurement locations according to angle, like FIG. 10, the location in which linearity is best exhibited is found. Furthermore, the points to be considered are: 1) the boundary affected by the magnetic flux becomes narrower as the magnetic flux density increases, and 2) the boundary affected by the magnetic flux become wider as the magnetic flux density decreases.

The initial measurement point A, which is spaced apart from the surface of the pole, may be changed. Furthermore, the shape of the magnet may be changed because the ratio of the heights of the left and right sides of the magnet may be changed.

As shown in FIG. 13, the boundary of the magnetic flux density becomes narrower as the intensity of the magnetic flux increases, and the boundary of the magnetic flux density becomes wider as the intensity of the magnetic flux decreases. Accordingly, when the measurement is conducted while the measurement locations are changed according to angle from point A of FIG. 10, magnetic flux density around point A increases, and thus the boundary becomes narrower. The magnetic flux density around point A has a characteristic in that it is inversely proportional to the square of measured distance. In contrast, the variation rate of the magnetic flux density for measured distances spaced apart from point A is smaller than at the point A because the magnetic flux density at point B is small. Accordingly, the variation in magnetic flux density depending on distance can be exhibited in the selected interval, in which linearity is excellent, by adjusting the measurement locations and the angles.

FIG. 11 is a graph showing variation in magnetic flux density according to another embodiment of the present invention. In the graph, variation in magnetic flux density depending on distance is exhibited in the selected interval, in which linearity is excellent, by adjusting the measurement locations and the angles.

In the graph, portion A indicates a slight nonlinear interval. The enlarged view of portion A is shown in FIG. 12.

FIG. 12 is an enlarged view of circled portion A of FIG. 11 according to the present invention, in which the magnitude of error in portion A is enlarged ten times.

In an embodiment, considering the overall characteristics of the graph, a characteristic that is nearly close to a rectilinear line is exhibited in a displacement interval ranging from 1.5 ☐ to 9.5 ☐ (the difference 8.0 ☐). That is, when the magnet or the programmable hall IC moves in a range of 8.0 ☐, locations can be detected according to distance. When such a characteristic is used for an application, the detection of locations can be achieved. Accordingly, when an initial value is set to 0 using the programmable hall IC and when the maximum value is set to a maximum distance (for example, 6 ☐) using a program, errors caused by mechanical assembly deviation and the like can be set using the program, so that the errors can be compensated for and the accuracy can be further increased.

FIGS. 14 and 15 are pictures obtained by capturing the magnetic flux distributions of the magnet at measurement locations using an actual magnetic viewer. As shown in the pictures, the portions in which the magnetic flux density is high are indicated by a dark color, and the portions in which the magnetic flux density is low are indicated by a bright color. Accordingly, from the pictures, it can be seen that the variation in magnetic flux density is proportional to distance. The actual magnetic viewer is chiefly used to observe the boundary surface between the S and N-poles. The form of the magnetic flux distribution can be observed somewhat using the magnetic viewer. The programmable hall IC is chiefly used to accurately measure the magnetic flux density. Furthermore, a Gauss meter may be used to measure the magnetic flux density. Accordingly, when the magnetic flux density is measured using the programmable hall IC, a more accurate measured value can be obtained.

FIG. 16 is a graph showing variations in magnetic flux densities of triangular and rectangular magnets according to the present invention, and shows a graph in which a result, which is obtained by assigning more accurate magnetic flux density to the rectangular magnet through a change in the magnetization pattern of the rectangular magnet, and a result, which is obtained by changing the shape and magnetization pattern of the triangular (trapezoidal) magnet, nearly coincide with each other. A characteristic in which magnetic flux density varies linearly according to distance in the effective interval of an actual magnet, that is, an interval ranging from 0 to 12, can be found. A magnet having a linear magnetic flux density, which can accurately perform control through the accurate detection of absolute location, can be obtained.

INDUSTRIAL APPLICABILITY

According to the present invention, a typical error correction process, which is a complicated process of converting variation in curve-shaped magnetic flux density to a rectilinear line, and location-related errors, which be generated during the error correction process, are eliminated using a construction that allows the intensity of magnetic flux, which is emitted from the surfaces of poles, to vary linearly by changing the shape of a magnet and adjusting the intensity and range of magnetization, and measures the density of linear magnetic flux that is emitted from the surfaces of the poles using a sensor that is spaced apart from the surfaces of the poles by a predetermined distance, is parallel to the surfaces of the poles, and moves parallel to the surfaces of the poles, thus accurately measuring the absolute distance based on voltage generated by the sensor. Accordingly, the present invention can provide a more accurate location sensor using a magnet.

The invention claimed is:

1. A magnet having a linear magnetic flux density, the magnet being used for a sensor for measuring distance, wherein the magnet is configured to have a rectangular shape, and N and S-poles of the magnet are magnetized along a boundary that is curved in a form of a sinusoidal wave in a diagonal direction from an edge of the rectangular-shaped magnet.

2. The magnet according to claim 1, wherein the N or S-pole constituting the magnet generates a linear magnetic flux density according to variation in distance varying along a rectilinear line, which is spaced apart from a surface of the N or S-pole by a predetermined distance and is parallel to the surface of the pole.

3. The magnet according to claim 2, wherein the magnetic flux density, which is generated by the N or S-pole constituting the magnet, varies linearly according to the surface of the N or S-pole.

4. The magnet according to claim 2, wherein the magnetic flux density, which is generated by the N or S-pole constituting the magnet, is measured by a sensor based on a distance varying along a rectilinear line, which is spaced apart from a surface of the pole by a predetermined distance and is parallel to the surface of the pole, and maintains linearity depending on varying distance.

5. The magnet according to claim 1, wherein the magnetic flux density, which is generated by the N or S-pole constituting the magnet, is measured by a sensor based on a distance varying along a rectilinear line, which is spaced apart from a surface of the pole by a predetermined distance and is parallel to the surface of the pole, and maintains linearity depending on varying distance.

6. The magnet according to claim 3, wherein the magnetic flux density, which is generated by the N or S-pole constituting the magnet, is measured by a sensor based on a distance varying along a rectilinear line, which is spaced apart from a surface of the pole by a predetermined distance and is parallel to the surface of the pole, and maintains linearity depending on varying distance.

7. A magnet having a linear magnetic flux density, the magnet being used for a sensor for measuring distance, wherein the magnet is configured such that a left surface thereof is higher than a right surface thereof, and a top surface thereof is slanted, and is configured to have a rectangular shape, wherein the magnet generates the linear magnetic flux density according to variation bar distances varying along rectilinear lines that are formed between a point A as a measurement starting point and an arbitrary points B as a measurement end point, wherein the point A and the arbitrary points B are spaced apart from a surface of a N or S-pole constituting the magnet by respective predetermined distances, and wherein the point A is disposed apart from an upper end of the right surface of the magnet and the arbitrary points B are disposed a art from an upper end of the left surface of the magnet forming different angles relative to point A, wherein the N and S-poles are magnetized such that respective widths of left and right surfaces of the magnet have a ratio of 1-2:2-4.

8. The magnet according to claim 7, wherein the magnetic flux density of the magnet varies linearly according to the surface of the N or S-pole.

9. The magnet according to claim 8, wherein the magnetic flux density of the magnet is measured using a sensor based on distances varying along the rectilinear lines that are formed between the point A and the arbitrary points B such that linearity depending on varying distances is maintained.

10. The magnet according to claim 7, wherein the magnetic flux density of the magnet is measured using a sensor based on distances varying along the rectilinear lines that are formed between the point A and the arbitrary points B such that linearity depending on varying distances is maintained.

* * * * *